(12) United States Patent
Hofmann

(10) Patent No.: US 6,311,241 B1
(45) Date of Patent: Oct. 30, 2001

(54) METHOD AND CONFIGURATION FOR TRANSFERRING PROGRAMS

(75) Inventor: Ludwig Hofmann, Ilmmünster (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,256

(22) Filed: Sep. 27, 1999

Related U.S. Application Data

(63) Continuation of application No. PCT/DE98/00219, filed on Jan. 23, 1998.

(30) Foreign Application Priority Data

Mar. 27, 1997 (DE) .............................................. 197 13 060

(51) Int. Cl.⁷ .................................................. G06F 13/00
(52) U.S. Cl. .................. 710/102; 710/100; 710/101; 710/103; 712/20; 455/405; 455/410; 455/411; 455/412; 455/558; 455/418; 365/51; 365/52
(58) Field of Search .................................. 710/100, 101, 710/102, 103; 455/410, 411, 412, 558, 405, 418, 419; 365/52, 51; 712/20

(56) References Cited

U.S. PATENT DOCUMENTS

| | | |
|---|---|---|
| 5,418,837 * | 5/1995 | Johansson et al. .................. 455/558 |
| 5,465,401 * | 11/1995 | Thompson . |
| 5,469,573 | 11/1995 | McGill, III et al. . |
| 5,644,636 * | 7/1997 | Fernandez ................................. 380/4 |
| 5,778,322 * | 7/1998 | Rydbeck .............................. 455/558 |
| 5,826,011 * | 10/1998 | Chou et al. ........................... 713/200 |
| 5,847,372 * | 12/1998 | Kreft .................................... 235/492 |
| 5,854,976 * | 12/1998 | Aguilera et al. ...................... 455/411 |
| 5,877,975 * | 3/1999 | Jigour et al. ........................... 365/52 |
| 5,915,226 * | 6/1999 | Martineau ............................. 455/558 |
| 6,032,038 * | 2/2000 | Schroderus et al. .................. 455/405 |
| 6,032,055 * | 2/2000 | Yazaki et al. ......................... 455/558 |

FOREIGN PATENT DOCUMENTS

| | | |
|---|---|---|
| 36 13 022 A1 | 11/1986 | (DE) . |
| 43 21 381 A1 | 1/1995 | (DE) . |

OTHER PUBLICATIONS

"Device and Method for the Replacement or Modification of Software in Equipment", Ludwig Flauger, 1/95 (translated from DE4321381).*

* cited by examiner

Primary Examiner—Rupal Dharia
(74) Attorney, Agent, or Firm—Herbert L. Lerner; Laurence A. Greenberg; Werner H. Stemer

(57) ABSTRACT

A method for transferring programs to an electronic unit, in which the program to be transferred is stored on a plug-in device. The program is transferred to the electronic unit after the plug-in device has been inserted into the electronic unit, the transfer being controlled by a controller in the plug-in device. The method relates in particular to the loading of programs from a plug-in card with a SIM interface to a mobile radio terminal.

6 Claims, 2 Drawing Sheets

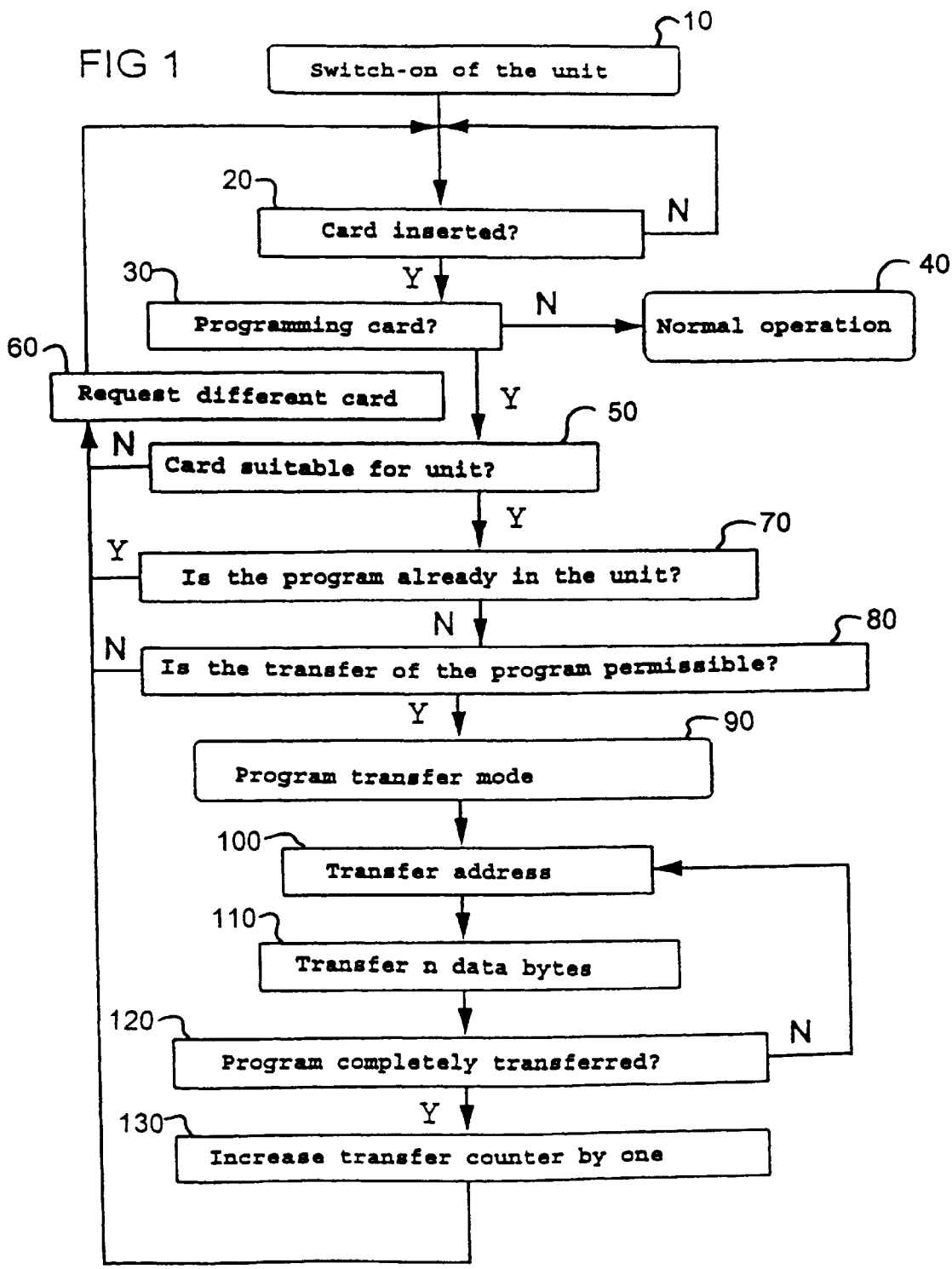

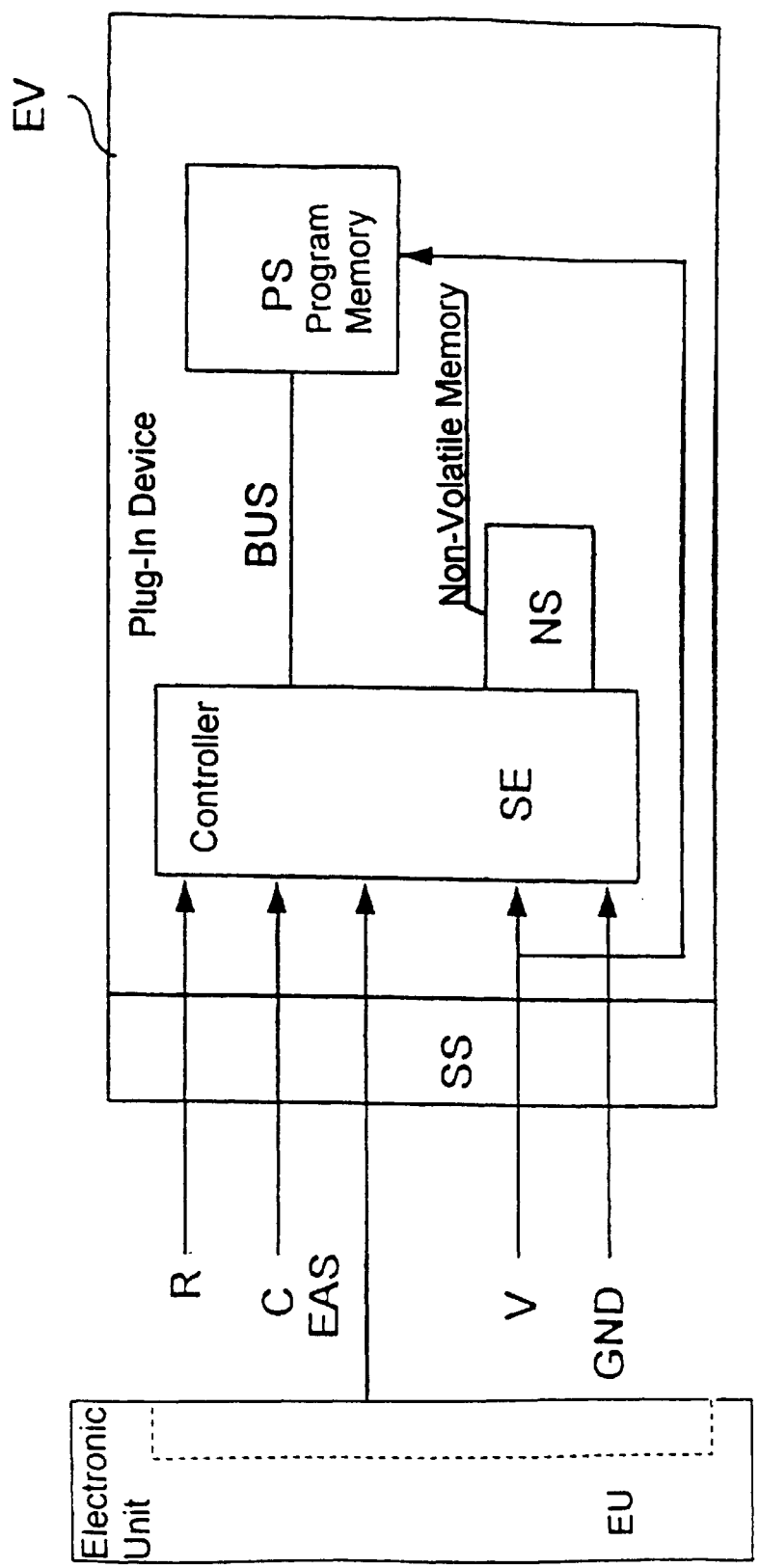

METHOD AND CONFIGURATION FOR TRANSFERRING PROGRAMS

CROSS-REFERENCE TO RELATED APPLICATION

This application is a continuation of copending International Application No. PCT/DE98/00219, filed Jan. 23, 1998, which designated the United States.

BACKGROUND OF THE INVENTION

1. Field of the Invention

The invention relates to a method for transferring programs to an electronic unit, and also to a configuration for carrying out the method. The term "program" in this case relates in particular to software and/or firmware used to operate the electronic unit.

After an electronic unit, which is provided with a processor for executing programs, (e.g. a mobile radio terminal) has been sold to the end customer, the situation frequently arises whereby new programs, software or firmware are intended to be transferred to the electronic unit. This may involve for example programs that enable new additional functions of the electronic unit or program updates that improve the properties of the electronic unit. To date, this problem has been solved either by transferring the programs from a PC to the electronic unit via a serial interface or by exchanging ROM or EPROM modules. In other methods, programs stored on a floppy disk, for example, are read by a floppy disk drive dedicated for this purpose. However, all these methods are associated with a high outlay and presuppose in some instances special hardware or peripherals. Moreover, correct registration of the number of programs sold by a dealer and/or transferred to units (e.g. mobile radio terminals) is possible only with difficulty using these methods.

SUMMARY OF THE INVENTION

It is accordingly an object of the invention to provide a method and a configuration for transferring programs which overcome the above-mentioned disadvantages of the prior art methods and devices of this general type, in which programs can be transferred to electronic units with little outlay and in the most practical way possible.

With the foregoing and other objects in view there is provided, in accordance with the invention, a method for transferring programs to an electronic unit, which includes storing a program to be transferred on a plug-in device; and transferring the program to the electronic unit after the plug-in device has been inserted into the electronic unit, the transfer being controlled by a controller of the plug-in device.

In this case, the programs that are stored on a plug-in device are transferred to the electronic unit after the plug-in device has been inserted into the electronic unit, the transfer being controlled by a controller in the plug-in device.

This has the advantage that the transfer does not have to be controlled by the unit and, therefore, the unit does not have to be provided with additional hardware or software.

In a preferred exemplary embodiment, the plug-in device is adapted to a slot—which is already present for other purposes on the electronic unit—for receiving plug-in cards and an associated interface, and the controller controls the transfer of the programs and adapts the transfer to the input/output interface which corresponds to the interface, or the corresponding transfer protocol. The effect achieved by this is that an already existing interface can be utilized for the program transfer, i.e. programs can be transferred without having to provide an interface separately for these purposes.

A further advantageous embodiment variant envisages that a non-volatile memory is additionally provided on the plug-in device, which memory registers the number of transfers of the program to the electronic units, and the transfer of the program is no longer permitted if a specific number of transfers have been carried out. In practice, this affords the advantage, for example, that a dealer having a plug-in device acquired from the manufacturer can transfer a new program only to a specific number of electronic units of end customers. This massively simplifies sales of the programs and the associated accounting.

The effect that can be achieved by the invention, particularly when the electronic unit already utilizes plug-in cards for user identification, for example, as is the case in current cellular mobile radio networks (SIM card), is that an existing device for receiving plug-in cards and the associated interface (SIM interface) can be utilized to transfer programs. In this case, the controller controls the transfer of the programs and enables utilization for example of an existing input/output interface (SIM input/output interface) and the associated transfer protocol (SIM protocol).

Other features which are considered as characteristic for the invention are set forth in the appended claims.

Although the invention is illustrated and described herein as embodied in a method and a configuration for transferring programs, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a flow chart of a sequence of a preferred embodiment variant of a method according to the invention; and FIG. 2 diagrammatic, block diagram of an embodiment of a device according to the invention.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a sequence of a transfer of programs to an electronic unit, in particular a communications terminal. After the unit has been switched on at step 10, a check is made to see whether a plug-in device (card) is inserted at step 20. If at step 30 it is determined that the card is not a programming card, but rather a SIM card, for example, then a normal operation of the unit is commenced at step 40.

However, if the card is a programming card, that is to say a card on which a program which is intended to be transferred to the unit is stored, then a check is made to see whether the card is suitable for the present unit at step 50. If suitability is not manifested, then a different card is requested at step 60. If the card is suitable, then a check is made to see whether the program is already stored in the unit at step 70. If the program is already stored in the unit, then a different card is requested. Otherwise, a check is made to see whether a transfer is permissible at step 80. For this purpose, the number of permissible program transfers is compared with the number of program transfers that have already been effected. In this case, these two values may be stored in non-volatile memories. The counting of the program transfers can also be realized by a counter. If it emerges that a further program transfer is permissible, the unit and the card are switched to the program transfer mode at step 90.

At step 100, a first address at which a first part of the program is to be stored in the unit is then transferred. Afterwards, n data bytes of the first part of the program are transferred to the unit during step 110. The last two steps 100, 110 are repeated until the program has been completely transferred and confirmed at step 120.

Finally, the number of program transfers is increased by one, the new value is stored on the plug-in card and a different card is requested during step 130.

A dialogue between a user and a communications terminal for controlling the sequence of the method may be effected here via a display.

Since the communications terminal for current mobile radio networks such as GSM is provided with a slot for receiving SIM cards for user identification, in an advantageous refinement it is possible for the plug-in device to have the form of a plug-in card of this type. Furthermore, the controller on the plug-in card can use the known transfer protocol of the SIM interface in order to handle the program transfer.

In a preferred embodiment variant of the invention, the control of the transfer of programs by the controller on the plug-in device is restricted to checking whether, on the basis of the number of previous program transfers, it is still permissible to carry out a further transfer.

FIG. 2 shows the plug-in device EV corresponding to the method according to the invention that has a program memory PS, on which the program data to be transferred are stored. The memory PS can preferably be configured as a flash module or as a ROM. A flash module has the advantage that the card can be reused in addition, the plug-in device EV has a controller SE for controlling the transfer of programs to the electronic unit EU and for adapting the transfer to an existing input/output interface EAS, for example a SIM input/output interface of a mobile radio terminal. The program memory PS may in this case be connected via a bus BUS to the controller SE or may be embodied as part of the controller (monolithically).

The controller SE itself can be realized independently of the program as digital hardware or as a micro-controller with an integrated program.

The transfer protocol on the basis of which the programs are transferred is handled via the input/output interface EAS. In addition, it is conceivable that an interface SS also ensures an appropriate power supply V, GND of the plug-in device EV and supplies the plug-in device EV with a reset control R and a clock control C.

In an embodiment variant of a configuration according to the invention, the input/output interface EAS corresponds to the SIM input/output interface of mobile radio terminals and the associated transfer protocol corresponds to a SIM protocol.

A further inventive configuration for carrying out the method is, furthermore, provided with a non-volatile memory NS which registers the number of transfers of a program. As an alternative to the non-volatile memory NS, it is also possible to use part of the program memory PS for this purpose. In this case, bits that are defined for this can then be erased after a program transfer (bit-by-bit counter).

Using the present description, a person skilled in the art can easily conceive of and configure further applications of the exemplary embodiments described above. Thus, this method can also be applied to consumer electronics equipment, automotive electronics or to domestic appliances. The method can fundamentally be applied to any unit which is provided with a processor and which can therefore be equipped with new functions by use of new programs or whose existing properties can be improved.

I claim:

1. A method for transferring programs to an electronic unit, which comprises:

storing a program to be transferred on a plug-in device;

transferring the program to the electronic unit after the plug-in device has been inserted into the electronic unit, the transfer being controlled by a controller of the plug-in device; and providing a non-volatile memory on the plug-in device, the non-volatile memory registering a number of transfers of the program to the electronic unit, and the transfer of the program is no longer permitted if a specific number of the transfers have been carried out.

2. The method according to claim 1, which comprises adapting the plug-in device to an existing slot of the electronic unit provided for receiving plug-in devices and has an input/output interface, the controller controlling and adapting a transfer of the program to the input/output interface corresponding to the existing slot.

3. The method according to claim 1, which comprises adapting the plug-in device to a slot of a communications terminal and an associated subscriber identity module (SIM) interface of the electronic unit for receiving a SIM card, the controller controlling and adapting the transfer of the program to a SIM input/output interface corresponding to the interface.

4. A plug-in device for transferring a program to an electronic unit having an existing input/output interface, the plug-in device comprising:

a plug-in device body configured for being inserted into the electronic unit;

a memory for storing programs to be transferred to the electronic unit and disposed on said plug-in device body;

a controller disposed on said plug-in device body for controlling a transfer of the programs to the electronic unit and for adapting the transfer to the existing input/output interface of the electronic unit after said plug-in device body has been inserted into said electronic unit; and a non-volatile memory connected to said controller and registering a number of transfers of a program wherein, a transfer of the program is no longer permitted if a specific number of transfers have been carried out.

5. The plug-in device according to claim 4, wherein said controller is realized independently of the programs as digital hardware.

6. The plug-in device according to claim 4, wherein said controller is realized independently of the programs as a microcontroller with an integrated program.

* * * * *